United States Patent
Ugaji et al.

(10) Patent No.: US 7,632,607 B2
(45) Date of Patent: *Dec. 15, 2009

(54) NEGATIVE ELECTRODE FOR BATTERY AND BATTERY USING THE SAME

(75) Inventors: Masaya Ugaji, Osaka (JP); Shinji Mino, Osaka (JP); Yasuyuki Shibano, Osaka (JP); Shuji Ito, Nara (JP)

(73) Assignee: Panasonic Corporation, Osaka (JP)

( * ) Notice: Subject to any disclaimer, the term of this patent is extended or adjusted under 35 U.S.C. 154(b) by 384 days.

This patent is subject to a terminal disclaimer.

(21) Appl. No.: 10/575,889

(22) PCT Filed: Oct. 14, 2005

(86) PCT No.: PCT/JP2005/018917

§ 371 (c)(1),
(2), (4) Date: Apr. 14, 2006

(87) PCT Pub. No.: WO2006/043470

PCT Pub. Date: Apr. 27, 2006

(65) Prior Publication Data

US 2007/0020520 A1    Jan. 25, 2007

(30) Foreign Application Priority Data

Oct. 21, 2004   (JP)   ............... 2004-306649

(51) Int. Cl.
*H01M 6/18* (2006.01)
*H01G 9/025* (2006.01)

(52) U.S. Cl. .............. 429/322; 429/304; 429/321; 252/62.2

(58) Field of Classification Search .............. None
See application file for complete search history.

(56) References Cited

FOREIGN PATENT DOCUMENTS

| EP | 1 630 893 A1 | 3/2006 |
|---|---|---|
| JP | 04-315775 | 11/1992 |
| JP | 2004-139968 | 5/2004 |
| JP | 2004-171875 | 6/2004 |
| JP | 2004171875 A * | 6/2004 |
| JP | 2004-335455 | 11/2004 |
| JP | 2005-38844 | 2/2005 |

OTHER PUBLICATIONS

JP 2004-171875 A, Jun. 2004, Kawase et al.*

* cited by examiner

*Primary Examiner*—Dah-Wei D Yuan
*Assistant Examiner*—Maria J Laios
(74) *Attorney, Agent, or Firm*—McDermott Will & Emery LLP (57) ABSTRACT

A negative electrode for a battery has a collector, active material layer, and inorganic compound layer. The active material layer is formed on the collector. The inorganic compound layer is formed on the surface of the active material layer. The inorganic compound layer is expressed by general formula $Li_xPT_yO_z$ or $Li_xMO_yN_z$. The compound composing the inorganic compound layer has lithium ion conductivity and excels in moisture resistance.

6 Claims, 3 Drawing Sheets

500
NEGATIVE ELECTRODE FOR BATTERY AND BATTERY USING THE SAME

RELATED APPLICATION

This application is a U.S. national phase application of PCT international application PCT/JP2005/018917.

TECHNICAL FIELD

The present invention relates to a negative electrode having a negative electrode active material layer and an inorganic compound layer, and to a battery using the negative electrode.

BACKGROUND ART

In recent years, the demand for a battery as a power supply for portable devices has been increasing with the development of the portable devices such as a personal computer and a mobile phone. Such application requires the battery to be used in a room-temperature and simultaneously to have a high energy density and superior cycling characteristics.

For such a demand, nonaqueous electrolyte lithium batteries have been developed that use lithium ions as charge-transfer media, using various types of nonaqueous electrolytes such as organic electrolyte, gel polymer electrolyte is which organic electrolyte is made illiquid by means of polymer or gelling agents, and solid electrolyte. Further, material with a high reversible electric potential has been discovered that reversibly stores lithium ions from various types of electrolytes and releases to them such as lithium cobaltate ($LiCoO_2$), lithium nickelate ($LiNiO_2$), or lithium manganate ($LiMn_2O_4$). Such kinds of material are utilized as positive electrode active material. Meanwhile, some kinds of elementary substance, alloys, or compounds with a low reversible electric potential has been discovered such as graphite or various types of carbon material, which are utilized as negative electrode active material. Furthermore, a lithium battery has been developed that uses these materials storing/releasing lithium ions as active materials.

A lithium battery which is far high in voltage and energy density compared to batteries using aqueous solution is currently the mainstream of small batteries. A battery using carbonaceous material as the negative electrode thereof is particularly valued for its safety in manufacturing and practical use, and reliability in characteristics. However, the capacity with carbonaceous material has presently reached its approximately maximum theoretical level, namely its limit. The energy density of a battery is greatly influenced by the capacity density of the material of its negative electrode, so new materials storing/releasing lithium ions are being explored in order to further improve the energy density of a battery.

Among these materials, an elementary substance of silicon (Si) or tin (Sn), or alloy materials including one or more of these elements is promising as material with a superior reversible capacity instead of carbonaceous materials. However, these materials tend to deteriorate in characteristics if used while directly contacting organic electrolyte in particular. Further, these materials, as a result of storing/releasing a large amount of lithium ions, may decay in the particle shape by miniaturization of crystals and may deteriorate in life characteristics due to incomplete joining with the collector.

Under the circumstances, the following makeup is proposed. That is, an ion-conductive inorganic compound layer is formed at the interface between metal that is negative electrode active and electrolyte, to isolate the negative electrode from the electrolyte. In this case, lithium ions are stored in and released from the negative electrode through the inorganic compound layer. Japanese Patent Unexamined Publication No. 2004-171875, for example, discloses as such an inorganic compound with lithium ion conductivity, lithium halide such as lithium fluoride and lithium iodide, lithium phosphate ($Li_3PO_4$), and preferably lithium phosphorus oxynitride (LIPON).

Electrolyte generally has residual minuscule amount of moisture at 10 ppm level that cannot be removed easily. Here, when the above-mentioned $Li_3PO_4$ or LIPON contacts moisture, phosphorus (P), originally being present as positive pentavalent, is reduced to phosphorus with a small oxidation number. Consequently, $Li_3PO_4$ or LIPON is decomposed, significantly decreasing the ion conductivity. As a result, an inorganic compound layer formed on the surface of the negative electrode active metal works as resistance to increase the impedance of the entire negative electrode, thus deteriorating the battery characteristics.

SUMMARY OF THE INVENTION

A negative electrode for a battery according to the present invention has an active material layer and an inorganic compound layer with lithium ion conductivity (sometimes referred to as "inorganic compound layer" hereinafter) provided on the active material layer. The active material layer includes at least one of an elementary substance of silicon (Si) or tin (Sn), alloy material or a compound including one or more of these elements. The inorganic compound layer is composed of a compound having a chemical composition expressed by any one of general formulas 1 and 2 described below.

General formula 1: $Li_xPT_yO_z$, where component T refers to at least one kind of element selected from the element group composed of element symbols Ti, Cu, Zr, Mo, Ta, and W; and additionally x, y, and z satisfies $2.0 \leq x \leq 7.0$, $0.01 \leq y \leq 1.0$, and $3.5 \leq z \leq 8.0$, desirably $2.0 \leq x \leq 3.0$, $0.01 \leq y \leq 0.50$, and $3.5 \leq z \leq 4.0$, respectively.

General formula 2: $Li_xMO_yN_z$, where M refers to at least one kind of element selected from the element group composed of element symbols Si, B, Ge, Al, C, Ga, and S; and additionally x, y, and z satisfy $0.6 \leq x \leq 1.0$, $1.05 \leq y \leq 1.99$, and $0.01 \leq z \leq 0.5$, respectively; $1.6 \leq x \leq 2.0$, $2.05 \leq y \leq 2.99$, and $0.01 \leq z \leq 0.5$, respectively; $1.6 \leq x \leq 2.0$, $3.05 \leq y \leq 3.99$, and $0.01 \leq z \leq 0.5$, respectively; or $4.6 \leq x \leq 5.0$, $3.05 \leq y \leq 3.99$, and $0.01 \leq z \leq 0.5$, respectively.

These compounds composing the inorganic compound layer, with high lithium ion conductivity and additionally moisture resistance, prevent the lithium ion conductivity from decreasing even if contacting electrolyte with residual moisture. As a result, the battery characteristics remain superior over a long period of charge/discharge cycles. In other words, significant improvement is made in stability against moisture in the negative electrode itself having an active material layer which stores/releases lithium ions, and in the cycling characteristics of a battery using such a negative electrode.

| REFERENCE MARKS IN THE DRAWINGS | |
|---|---|
| 1 | Negative electrode |
| 2 | Positive electrode |
| 3 | Electrolyte |
| 4 | Gasket |
| 5 | Lid |
| 6 | Case |
| 7 | Positive electrode collector |
| 8 | Positive electrode active material layer |
| 9 | Collector |
| 10 | Negative electrode active material layer |
| 11 | Inorganic compound layer |

DETAILED DESCRIPTION OF PREFERRED EMBODIMENT

Hereinafter, a description is made for embodiments of the present invention with reference to accompanying drawings. The present invention is not limited to the following content as long as it is based on the basic features described in this description.

First Exemplary Embodiment

Figure 1:
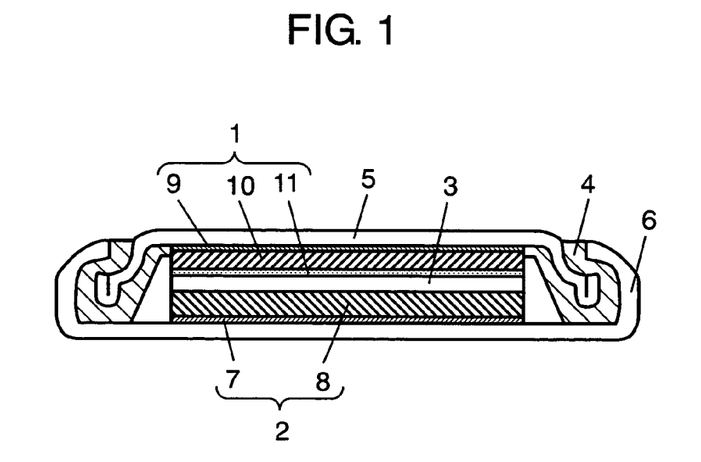
FIG. 1 is a conceptual sectional view illustrating the basic makeup of a battery and a negative electrode used therefor, according to a first embodiment and a second embodiment of the present invention.

FIG. 1 is a sectional view of a battery using a negative electrode according to a first embodiment of the present invention. The battery has negative electrode 1, positive electrode 2 which faces negative electrode 1 and reduces lithium ions when discharging, and electrolyte 3 which intervenes between negative electrode 1 and positive electrode 2 to conduct lithium ions. Negative electrode 1 and positive electrode 2, along with electrolyte 3, are contained in case 6 with gasket 4 and lid 5. Positive electrode 2 is composed of positive electrode collector 7 and positive electrode active material layer (referred to as "active material layer" hereinafter) 8, including positive electrode active material. Negative electrode 1 has collector 9, negative electrode active material layer (referred to as "active material layer" hereinafter) 10 provided on the surface of collector 9, and additionally inorganic compound layer 11 with lithium ion conductivity formed on the surface of active material layer 10.

Active material layer 10 can be applied by an alloy, compound, or solid solution, including at least one of tin (Sn) and silicon (Si), as active material which stores/releases lithium ions. Such material may be, besides Sn or Si, $Ni_3Sn_4$, $Mg_2Sn$, $SnO_x$ ($0<x<2$), $SnO_2$, $SiB_4$, $SiB_6$, $Mg_2Si$, $NiSi_2$, $Ni_2Si$, TiSi, $TiSi_2$, MoSi, $CoSi_2$, $CaSi_2$, $CrSi_2$, $Cu_5Si$, $FeSi_2$, $MnSi_2$, $NbSi_2$, $TaSi_2$, $VSi_2$, $WSi_2$, $ZnSi_2$, SiC, $Si_3N_4$, $Si_2N_2O$, $SiO_x$ ($0<x<2$), $SiN_y$ ($0<y<4/3$), $SiO_2$, $SnSiO_3$, or LiSnO. These substances may compose active material layer 10 either singularly or plurally. In a case where plural substances simultaneously compose layer 10, the following substances may be used such as compounds including Si, oxygen, and nitrogen or a complex made of compounds including Si and oxygen with different ratios of Si to oxygen. In these ways, layer 10 includes at least one of elementary substance Sn, elementary substance Si, an alloy including at least one of Sn and Si, and a compound including at least one of Sn and Si.

As collector 9, metal or alloy with lower reactivity than lithium is used, which is formed in a conductor plate or sintered body with an arbitrary shape. Such substance may be one or more elementary substances, an alloy, steel, or stainless-steel, including one or more substances selected from copper (Cu), nickel (Ni), titanium (Ti), molybdenum (Mo), tantalum (Ta), iron (Fe), and carbon (C). Among these substances, conductive material prone to form an alloy with metal as active material may be preferably selected. If active material layer 10 includes metal in this way, the metal of active material layer 10 is preferably alloyed with collector 9 at a part of the interface with collector 9. Consequently, active material layer 10 is more tightly joined with collector 9, and thus the battery characteristics remain superior over a long period of charge/discharge cycles.

The above-mentioned alloy-forming is preferably made when active material layer 10 is formed using active material on collector 9. Methods of forming such an alloy may include joining an active material layer having been shaped on the collector surface; applying powder of an active material component; forming a plating layer; and forming a layer by means of deposition or sputtering. The type of alloy may be either an intermetallic compound or solid solution. When required, a thin film may be formed from the above-mentioned collector material with sputtering on a self-shape retaining base made of oxide such as silica, or of carbon. When alloying at the interface, heat treatment for promoting the alloying, such as sintering, is preferably performed after forming active material layer 10. As a result of such alloying, active material layer 10 is more tightly joined with collector 9, and thus the battery characteristics remains superior over a long period of charge/discharge cycles.

Inorganic compound layer 11 is composed of a compound having the chemical composition expressed by $Li_xPT_yO_z$. Component T refers to at least one kind of element selected from the element group composed of titanium (Ti), copper (Cu), zirconium (Zr), molybdenum (Mo), tantalum (Ta), and tungsten (W); and additionally x, y, and z satisfy $2.0 \leq x \leq 7.0$, $0.01 \leq y \leq 1.0$, and $3.5 \leq z \leq 8.0$, respectively, desirably $2.0 \leq x \leq 3.0$, $0.01 \leq y \leq 0.50$, and $3.5 \leq z \leq 4.0$, respectively; or $2.0 \leq x \leq 3.0$, $0.01 \leq y \leq 1.0$, and $3.5 \leq z \leq 7.0$, respectively. The above-mentioned $Li_xPT_yO_z$ is material superior in lithium ion conductivity and moisture resistance, and is discovered by the inventors of the present invention as disclosed in Japanese Patent Unexamined Publication No. 2004-335455.

Here, component T may be, besides the above substances, at least one kind of element selected from the element group composed of elements vanadium (V), chrome (Cr), manganese (Mn), iron (Fe), cobalt (Co), nickel (Ni), niobium (Nb), ruthenium (Ru), silver (Ag), platinum (Pt), and gold (Au). These elements are similar in property as Ti, Cu, Zr, Mo, Ta, and W, and thus presumption is reasonably made that adding any of these elements will bring similar advantages as well.

$Li_xPT_yO_z$ is composed of element components of lithium phosphate and transition metal group T. When this compound contacts water molecules, component T, namely transition metal, is assumed to be reduced in preference to phosphorus atom. Consequently, decomposition of the lithium phosphate component is suppressed, and so a decrease in ion conductivity of inorganic compound layer 11 itself is suppressed. In $Li_xPT_yO_z$, reduction of phosphorus could be suppressed as a result that transition metal component T is present. Therefore, transition metal component T may be introduced into lithium phosphate at the atomic level, or may be mixed with lithium phosphate at the particle level.

Meanwhile, if metal component T is contained as an oxide, component T may be partly introduced into lithium phosphate at the atomic level, or may be mixed with lithium phosphate at the particle level.

If metal component T is contained as a lithium oxide, the lithium phosphate and the lithium oxide of metal component T may form solid solution, mixed at the particle level, or the oxide of metal component T may be mixed with lithium oxide at the particle level.

In order for $Li_xPT_yO_z$ to sufficiently obtain superior ion conductivity and a function for suppressing the decomposition of ion-conductive solid in a humid environment, x, y, and z desirably satisfy $2.0 \leq x \leq 7.0$, $0.01 \leq y \leq 1.0$, and $3.5 \leq z \leq 8.0$, respectively. If transition metal is used as a target for the transition metal component T when $Li_xPT_yO_z$ is formed, the composition preferably satisfies $2.0 \leq x \leq 3.0$, $0.01 \leq y \leq 0.50$, and $3.5 \leq z \leq 4.0$; if transition metal oxide is used as a target, the composition preferably satisfies $2.0 \leq x \leq 3.0$, $0.01 \leq y \leq 1.0$, and $3.5 \leq z \leq 7$; and if lithium transition metal oxide is used as a target, the composition preferably satisfies $2.0 \leq x \leq 7.0$, $0.01~10 \leq y \leq 1.0$, and $3.5 \leq z \leq 8.0$.

Next, a description is made for the respective layers forming negative electrode 1. As shown in FIG. 1, collector 9, active material layer 10, and inorganic compound layer 11 are preferably laminated sequentially. In this case, active material layer 10 is preferably to be fully covered with inorganic compound layer 11, although the area and shape can be arbitrarily defined for each layer formed. If the battery is composed with both sides of negative electrode 1 facing positive electrode 2, the two sides are preferably provided thereon with active material layer 10 and inorganic compound layer 11. Although the thickness of inorganic compound layer 11 is arbitrary, a thin film with a thickness of 0.05 μm to 10 μm is preferable considering protection performance against a humid environment, impedance, and physical strength.

Inorganic compound layer 11 can be formed by applying $Li_xPT_yO_z$ mixed with a binding agent such as polyvinylidene fluoride. Alternatively, layer 11 can be formed by dry thin film process with lithium phosphate and transition metal such as W, Mo, or Ta, which is component T; or metal oxide of these substances, as a target or a deposition source. In other words, layer 11 is preferably formed on active material layer 10 in an argon or vacuum environment, by means of deposition method such as normal deposition, resistance heating deposition, high-frequency heating deposition, laser ablation deposition, or ion beam deposition; or a usual thin film forming method such as sputtering or rf magnetron sputtering. Instead of lithium phosphate, a mixture of $Li_2O$ and $P_2O_5$ may be used as a target or a deposition source.

In such inorganic compounds, the valence number of the lithium atom, phosphorus atom, and oxygen atom are positive univalent, positive pentavalent, and negative divalent, respectively. Element component T of transition metal has the same valence number as in a state of the compound when the compound is used as a target. Meanwhile, if an elementary substance of transition metal is used as a target, component T is assumed to be introduced into lithium phosphate in a state of metal.

A method of deriving x, y, and z in produced $Li_xPT_yO_z$ is described hereinafter. That is, the ratio of phosphorus atoms is assumed to be 1 first. Next, the ratio of component T to phosphorus atoms is derived with inductive coupled high-frequency plasma spectral analysis (ICP spectral analysis) or the like, to calculate y. Further, the ratio of oxygen to phosphorus atoms or transition metal atoms is derived with nitrogen oxygen analysis or the like, to calculate z. In nitrogen oxygen analysis, for example, oxygen and nitrogen included in the material are extracted by inert gas-impulse heating fusion, namely heat decomposition in a high-temperature state. Consequently, oxygen is detected as CO gas with a high-sensitivity nondispersive infrared detector, and nitrogen is detected as $N_2$ gas with a high-sensitivity thermal conductivity detector. Value of x is calculated from the above-mentioned valence numbers assuming that the entire valence number is 0.

The components of electrolyte 3, case 6, and others can generally employ any material and shape of a battery using a lithium compound or lithium alloy as its negative electrode. Active material layer 8 uses a material reversibly storing/releasing lithium ions electrochemically, such as $LiCoO_2$, $LiNiO_2$, $LiMn_2O_4$, or a mixture or complex compound of these substances.

Electrolyte 3 can employ electrolyte solution in which solute is dissolved in organic solvent, or a so-called polymer electrolyte layer, which includes the above electrolyte solution and is made illiquid with polymer. At least when using electrolyte solution, a separator made of polyethylene and the like between positive electrode 2 and negative electrode 1 is preferably used and is impregnated with the solution. Electrolyte 3 may be solid.

The material of electrolyte 3 is selected on the basis of an oxidation-reduction potential of the active material included in positive electrode 2 or other factors. If electrolyte 3 is organic electrolyte solution, preferable solute is salt generally used in a lithium battery, such as lithium fluoride, lithium chloride, lithium bromide, lithium iodide, lithium nitride, lithium phosphate, lithium silicate, lithium sulfide, or lithium phosphide. Organic solvent for dissolving such supporting salt can employ solvent used in a lithium battery, such as a mixture of one or more of propylene carbonate, ethylene carbonate, diethyl carbonate, methyl ethyl carbonate, dimethyl carbonate, 1,2-dimethoxyethane, 1,2-diethoxyethane, γ-butyrolactone, tetrahydrofuran, 2-methyl tetrahydrofuran, 1,3-dioxolan, 4-methyl-1,3-dioxolan, diethyl ether, sulfolane, acetonitrile, propylnitrile, anisole, acetate ester, and propionate ester. If electrolyte 3 is solid, it is preferably composed of $Li_xPT_yO_z$ forming inorganic compound layer 11. In this case, moisture permeates inorganic compound layer 11 directly from the outside of the battery.

Whichever makeup of the above-mentioned ones negative electrode 1 has, inorganic compound layer 11 protects active material layer 10, resulting in favorable battery characteristics. That is, producing negative electrode 1 as above-mentioned increases moisture resistance of negative electrode 1 and suppresses deterioration of the charge/discharge cycling characteristics of a battery using negative electrode 1. Such negative electrode 1 can be applied to any lithium battery using negative electrode active material including Si or Sn capable of storing/releasing lithium as an elementary substance, compound, or alloy, thus improving storage stability and charge/discharge cycling characteristics.

When a battery is charged and discharged, the negative electrode functions as a negative electrode, only after lithium ions are stored in active material layer 10, which does not directly contact electrolyte 3, through inorganic compound layer 11. That is, inorganic compound layer 11, facing electrolyte 3, works as a moving path of lithium ions to active material layer 10 separated from electrolyte 3. With this makeup, even if electrolyte 3 includes moisture, inorganic compound layer 11 can continue working as the moving path of ions, without being influenced by moisture in electrolyte 3.

Hereinafter, a description is made for the features and advantages of the first exemplary embodiment of the present invention with specific practical examples. As an example, inorganic compound layer 11 was formed that was composed of a compound having the chemical composition expressed by $Li_xPT_yO_z$, on active material layer 10 formed on collector 9 made of Cu, as the following.

In samples 1 through 6, active material layer 10 was first formed with a thickness of 3 μm, using Si as its negative electrode active material, by means of electron beam vacuum evaporation method, on collector 9 made of electrolytic copper foil with a thickness of 35 μm and a surface roughness of 2 μm. Si with a purity of 99.9999% was used as the target. Then, after decompressing the inside of the vacuum chamber, the target was irradiated with an electron beam with an accelerating voltage of −8 kV and with an emission current being set to 500 mA. The Si vapor accumulated on collector 9 placed on a fixed base, forming active material layer 10 made of Si with the deposition time of 20 minutes. After cutting off obtained negative electrode 1, analyzing the proximity of the interface between collector 9 and active material layer 10 with XPS (X-ray photoelectron spectroscopy) and AES (Auger electron spectroscopy) revealed that at least a part of the interface was alloyed.

In sample 7, active material layer 10 was formed with a thickness of 3 μm using Sn as its negative electrode active material on collector 9 similar to that in sample 1 by means of electrolytic plating method. For the electrolytic plating, a plating bath with the composition shown in table 1 and metal tin as a counter positive electrode was employed. Then negative electrode 1 formed therein with active material layer was heat-treated in a vacuum at 200° C. for 10 hours.

TABLE 1

| Substance name | Concentration |
| --- | --- |
| Stannous sulfate | 40 g · dm$^{-3}$ |
| Sulfuric acid 98% | 150 g · dm$^{-3}$ |
| Formalin | 5 cm$^3$ · dm$^{-3}$ |
| Additive | 40 cm$^3$ · dm$^{-3}$ |

In sample 8, active material layer 10 was formed with a thickness of 1.5 μm, using 50 wt % Si—50 wt % $TiSi_2$ as its active material by means of rf sputtering on collector 9 similar to that in sample 1. The sputtering was performed with chip-like Ti metal placed on the Si target with a diameter of 4 inches in an argon atmosphere of 2 Pa at an rf power of 500 W for one hour.

In sample 9, active material layer 10 was formed with a thickness of 1.0 μm, using 50 wt % Sn—50 wt % $Ni_3Sn_4$ as its active material by means of rf sputtering on collector 9 similar to that in sample 1. The sputtering was performed using a mixture of Sn and $Ni_3Sn_4$ with a diameter of 4 inches as a target in an argon atmosphere of 3 Pa at an rf power of 100 W for 20 minutes.

In samples 7 through 9, in the same way as in samples 1 through 6, analyzing the proximity of the interface between collector 9 and active material layer 10 with XPS and AES proved that at least a part of the interface was alloyed and joined.

In sample 10, active material layer 10 was formed with a thickness of 1.0 μm using $SiO_x$ (0<x<2) as its active material by means of electron beam vacuum evaporation method on collector 9 similar to that in sample 1. Si with a purity of 99.9999% was used as a target. Then, after decompressing the inside of the vacuum chamber, oxygen gas with a purity of 99.7% was introduced from a nozzle into the chamber at a flow rate of 80 sccm. Further, the target was irradiated with an electron beam with an accelerating voltage of −8 kV and with an emission current being set to 500 mA. The Si vapor, after passing through the oxygen atmosphere, accumulated on collector 9 placed on a fixed base, forming active material layer 10 made of $SiO_x$ with the deposition time being 20 minutes. Quantifying the oxygen included in obtained active material layer 10 proved the composition of this compound is $SiO_{0.5}$.

Next, for each sample, inorganic compound layer 11 was formed with a thickness of 500 nm made of $Li_xPT_yO_z$ by means of rf sputtering on active material layer 10. At those times, $Li_3PO_4$ with a diameter of 4 inches and one of the transition metal elements as shown in table 2 were used as targets in each sample. The sputtering was performed in an argon atmosphere of 5 mTorr at an rf power of 100 W for $Li_3PO_4$ and 25 W for transition metal component T, respectively, for 10 minutes. The thickness of inorganic compound layer 11 formed was approximately 0.15 μm. The composition of inorganic compound layer 11 formed was derived by analyzing a sample that was obtained by placing a platinum plate beside collector 9 formed with active material layer 10 when forming inorganic compound layer 11, with ICP spectral analysis. This method proved that the composition of the composition is $Li_{2.8}PT_{0.2}O_{3.9}$.

Meanwhile, in order to compare the characteristics of samples 1 through 10 with those in the conventional makeup, comparative samples 1 through 5 were produced, each of them were formed with a layer made of nitride of lithium phosphate (LIPON) instead of inorganic compound layer 11 as in sample 1. Active material layers 10 in comparative samples 1 through 5 were to be the same as in samples 1, 7, 8, 9, and 10, respectively. In forming the LIPON layer, a mixed gas of argon and nitrogen was used as a discharge gas, and $Li_3PO_4$ was used as a target. The thickness of the LIPON layer was approximately 0.2 μm. The other conditions were the same as in samples 1, 7, 8, 9, and 10. Table 2 shows the makeup of samples 1 through 10, and comparative samples 1 through 5.

TABLE 2

| Sample | Active material layer | Transition metal element | Capacity retention rate (%) |
| --- | --- | --- | --- |
| 1 | Si | W | 65.0 |
| 2 | Si | Mo | 63.7 |
| 3 | Si | Ta | 59.5 |
| 4 | Si | Ti | 60.9 |
| 5 | Si | Cu | 63.0 |
| 6 | Si | Zr | 63.2 |
| 7 | Sn | W | 60.5 |
| 8 | Si/TiSi$_2$ | W | 63.3 |
| 9 | Sn/Ni$_3$Sn$_4$ | W | 62.3 |
| 10 | SiO$_x$ | W | 61.2 |
| Comparative sample 1 | Si | — | 43.4 |
| Comparative sample 2 | Sn | — | 38.9 |
| Comparative sample 3 | Si/TiSi$_2$ | — | 41.7 |
| Comparative sample 4 | Sn/Ni$_3$Sn$_4$ | — | 40.7 |
| Comparative sample 5 | SiO$_x$ | — | 40.4 |

Next, in order to evaluate various types of negative electrodes 1 produced in those ways, and the cycling characteristic of batteries using these negative electrodes, coin-type secondary batteries shown in FIG. 1 were produced using positive electrode 2 with $LiCoO_2$ as its active material, in the procedure described below.

Positive electrode 2 was produced in the following way.

First, $LiCoO_2$ as positive electrode active material, acetylene black as a conductive agent, and polyvinylidene fluoride as a binding agent were mixed at a ratio of 90:5:5 by weight. This mixture was dispersed in N-methylpyrrolidone to prepare a positive electrode paste. Next, this positive electrode paste was applied with doctor blade method on positive electrode collector 7 made of aluminum foil, and pressed after drying by heating, to form active material layer 8. Then case 6 to be a positive electrode terminal was attached to positive electrode collector 7.

Electrolyte 3 was prepared by dissolving $LiPF_6$ by 1 mol/L in mixed solvent of ethylene carbonate and ethyl methyl carbonate at a ratio of 1:1 by volume. A micro porous thin film was impregnated with this solution, where the thin film is usually on the market as a separator, made of polyethylene, with a hole ratio of approximately 40% and a thickness of 30 μm. The moisture content was measured as 12 ppm according to Karl Fischer's method.

The coin-type battery with a diameter of 20 mm and height of 1.6 mm was produced from the above-mentioned constructional elements. At this time, lid 5 including negative electrode 1 was overlaid on case 6 including positive electrode 2, and case 6 was crimped through gasket 4, to seal the opening. Here, the battery was designed so that the charge/discharge capacity of positive electrode 2 was twice that of negative electrode 1, and the capacity was restricted by that of the negative electrode.

Next, each battery was introduced into a thermostatic chamber at 20° C. to perform a charge/discharge cycle test. At that time, each battery was first charged to 4.2 V with a constant current at which the designed capacity is completely discharged in five hours, namely 5-hour rate. Then after changing to constant voltage charge of 4.2 V, each battery was further charged until the current was reduced to 5% of the value of constant current charge. When discharging, constant current discharge was performed at the same current as in constant current charge until the battery voltage dropped to 2.5 V, and then the discharge capacity was measured. In this way, the ratio of the discharge capacity during cycling to that of the first time, namely the change in capacity retention rate, was examined. Further, the capacity retention rate after 100 cycles was compared as required. Examining negative electrode 1 of a battery being decomposed after charging proved that lithium was stored in active material layer 10.

Figure 2:
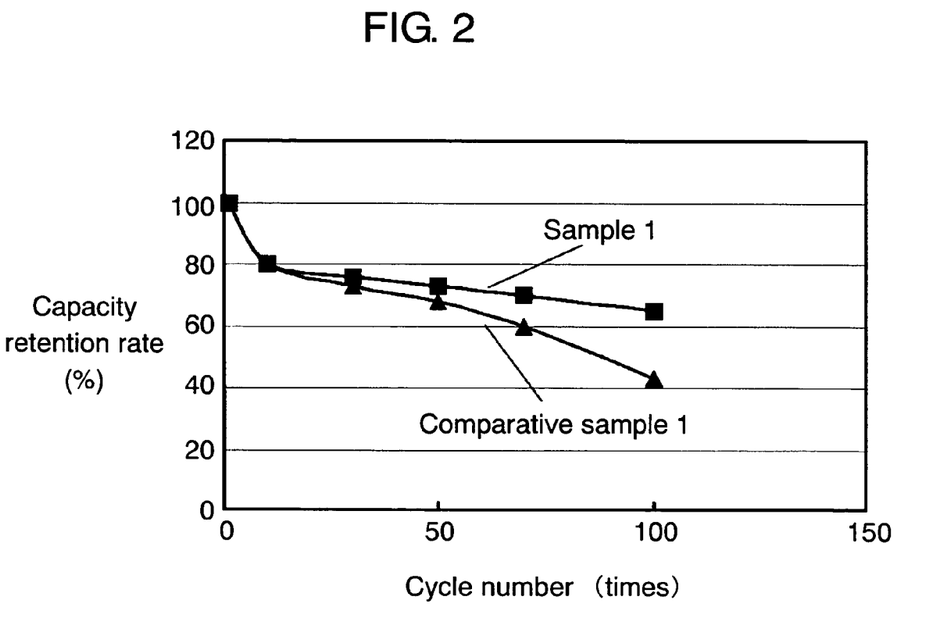
FIG. 2 is a cycling characteristics diagram according to the first embodiment of the present invention.

FIG. 2 illustrates the relationship between the capacity retention rate and cycle number (cycling characteristics) of the batteries in sample 1 and comparative sample 1. As evidenced by the figure, the capacity retention rate decreased early in comparative sample 1 in which an inorganic compound layer was formed therein with LIPON as a conventional ion conductor. Contrarily in sample 1 in which tungsten W was selected as component T, and inorganic compound layer 11 was formed that was composed of a compound having the chemical composition expressed by general formula $Li_xPT_yO_z$, the cycling characteristics were remarkably improved with respect to comparative sample 1.

Table 2 shows the comparison result of the capacity retention rate after 100 cycles. Each of comparative samples 1 through 5 formed with the inorganic compound layer made of LIPON, showed a capacity retention rate of approximately 40%. Contrarily, each of samples 1 through 10, formed with inorganic compound layer 11 according to the present invention, retained a capacity retention rate of approximately 60% or higher even after 100 cycles, presenting a superior cycling characteristic.

As mentioned above, forming inorganic compound layer 11 with a compound having the chemical composition expressed by general formula $Li_xPT_yO_z$, improved the cycling characteristics, so the improvement is assumed to be independent of the composition of active material layer 10. Under the circumstances, the following examinations were made for cases where active material layer 10 as same as those in samples 1 through 6 was used.

Next, the result of examining the range of value y in general formula $Li_xPT_yO_z$ is described. Here a description is made as an example for a case where tungsten (W) is used as component T.

As shown in table 3, samples 1A through 1H were produced. In producing these samples, each of inorganic compound layer 11 was formed that was composed of a compound having the chemical composition expressed by $Li_xPW_yO_z$ with a different W/P, namely the mole fraction of W to P, with the power of sputtering rf being changed in the makeup of sample 1. Value W/P corresponds to y in the composition formula. Other conditions were the same as in sample 1. Each value W/P was 0.005, 0.01, 0.05, 0.1, 0.2, 0.5, 0.6, and 0.8, for samples 1A through 1H.

TABLE 3

| Sample | y |
| --- | --- |
| 1A | 0.005 |
| 1B | 0.01 |
| 1C | 0.05 |
| 1D | 0.1 |
| 1E | 0.2 |
| 1F | 0.5 |
| 1G | 0.6 |
| 1H | 0.8 |
| Comparative sample 1 | 0 |

Figure 3:
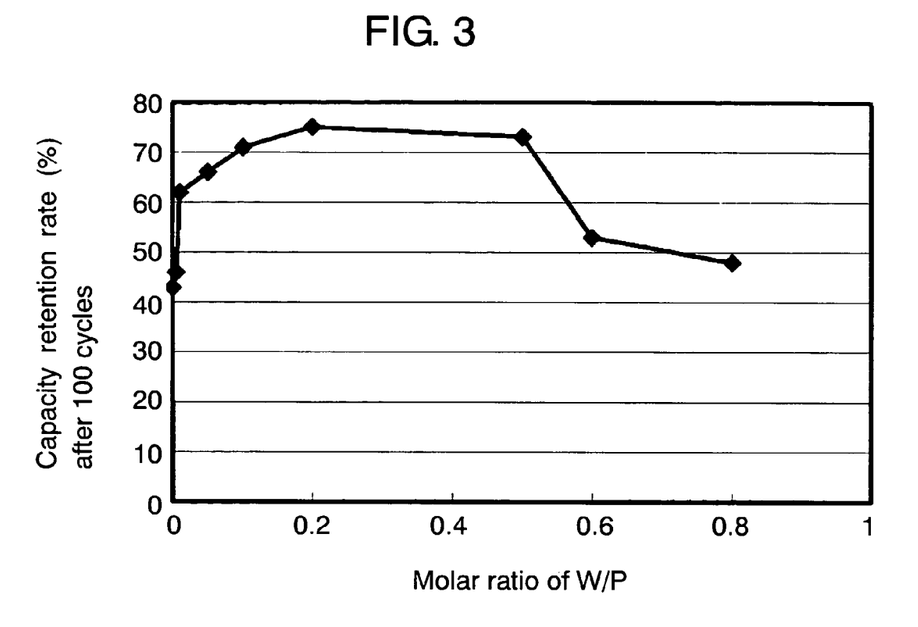
FIG. 3 illustrates a relationship between W/P and a capacity retention rate of a composition in an inorganic compound layer according to the first embodiment of the present invention.

Evaluation was performed for batteries using these samples and produced in the same way as in sample 1. More specifically, charge/discharge was performed on the same conditions as the above for a battery using a negative electrode with $Li_xPW_yO_z$ having molar ratio (y) with a different W/P formed in inorganic compound layer 11. FIG. 3 illustrates the relationship thus obtained between the capacity retention rate and W/P at the 100th cycle. As evidenced by FIG. 3, the capacity retention rate was 60% or higher at the 100th cycle with a W/P between 0.01 and 0.5, indicating favorable characteristics.

Next, a description is made for a case where the raw material for inorganic compound layer 11 is changed. First, transition metal oxide shown in table 4 is used instead of an elementary substance of component T of transition metal element to form inorganic compound layer 11.

TABLE 4

| Sample | Transition metal oxide | Composition of inorganic compound layer | Capacity retention rate (%) |
| --- | --- | --- | --- |
| 1J | $WO_3$ | $Li_{2.8}PW_{0.2}O_{4.5}$ | 66.6 |
| 2J | $MoO_3$ | $Li_{2.8}PMo_{0.2}O_{4.5}$ | 65.0 |
| 3J | $Ta_2O_5$ | $Li_{2.8}PTa_{0.2}O_{4.4}$ | 62.5 |

TABLE 4-continued

| Sample | Transition metal oxide | Composition of inorganic compound layer | Capacity retention rate (%) |
|---|---|---|---|
| 4J | $TiO_2$ | $Li_{2.8}PTi_{0.2}O_{4.3}$ | 63.2 |
| 5J | CuO | $Li_{2.8}PCu_{0.2}O_{4.1}$ | 63.9 |
| 6J | $ZrO2$ | $Li_{2.8}PZr_{0.2}O_{4.3}$ | 64.8 |
| Comparative sample 1 | — | $Li_{2.8}PO_{3.45}N_{0.3}$ | 43.4 |

Active material layer: Si

Negative electrode 1 was formed in the same way as in sample 1 except that transition metal oxide shown in table 4 was used as a target for sputtering. Each battery was produced using obtained negative electrode 1 of samples 1J through 6J. Table 4 also shows the compositions of inorganic compound layer 11 in samples 1J through 6J. Table 4 further shows the capacity retention rates after 100 cycles, which are the result of evaluating the batteries obtained on the same conditions as the above.

As evidenced by table 4, comparative sample 1 showed a capacity retention rate of 43.4%. Contrarily, samples 1J through 6J, forming inorganic compound layer 11 composed of a compound having the chemical composition expressed by $Li_xPT_yO_z$, retained a capacity retention rate of 60% or higher even after 100 cycles, presenting superior cycling characteristics. As a result, even if transition metal oxide was used as raw material except for an elementary substance of transition metal, the cycling characteristics were improved. Here, presumption is reasonably made that using the following substances, besides transition metal oxides shown in table 4, will bring similar advantages as well. The substances are vanadium pentoxide ($V_2O_5$), chromium trioxide ($Cr_2O_3$), manganese dioxide ($MnO_2$), iron oxide ($Fe_3O_4$), cobalt oxide ($Co_3O_4$), nickel oxide (NiO), niobium pentoxide ($Nb_2O_5$), and silver oxide ($Ag_2O$).

Next, a description is made for a case where transition metal oxide including lithium shown in table 5 is used instead of an elementary substance of component T of transition metal element as a target to form inorganic compound layer 11.

TABLE 5

| Sample | Transition Metal oxide | Composition of inorganic compound layer | Capacity retention rate (%) |
|---|---|---|---|
| 1K | $Li_2WO_4$ | $Li_{3.5}PW_{0.25}O_{5.0}$ | 65.9 |
| 2K | $Li_2MoO_4$ | $Li_{3.5}PMo_{0.25}O_{5.0}$ | 65.8 |
| 3K | $Li_3TaO_4$ | $Li_{3.75}PTa_{0.25}O_{5.0}$ | 61.8 |
| 4K | $Li_4TiO_4$ | $Li_{4.0}PTi_{0.25}O_{5.0}$ | 62.6 |
| 6K | $Li_4ZrO_4$ | $Li_{4.0}PZr_{0.25}O_{5.0}$ | 64.3 |
| Comparative sample 1 | — | $Li_{2.8}PO_{3.45}N_{0.3}$ | 43.4 |

Active material layer: Si

Each negative electrode 1 was formed in the same way as in sample 1 except that transition metal oxide including lithium shown in table 5 was used as a target for sputtering. Each battery was produced using obtained negative electrode 1 in samples 1K through 4K, and 6K. The compositions of inorganic compound layers 11 in samples 1K through 4K, and 6K are shown in table 5. Table 5 further shows the capacity retention rates after 100 cycles, which were the result of evaluating the obtained batteries on the same conditions as above. As is clear from table 5, comparative sample 1 had a capacity retention rate of 43.4%. Contrarily, samples 1K through 4K, and 6K, each forming inorganic compound layer 11 composed of a compound having the chemical composition expressed by $Li_xPT_yO_z$, retained a capacity retention rate of 60% or higher even after 100 cycles, presenting superior cycling characteristics. As described, even if transition metal oxide including lithium is used as raw material instead of an elementary substance of transition metal, the cycling characteristics are improved.

Next, the result of examining value y is described when transition metal oxide including lithium is used instead of an elementary substance of component T of transition metal element as a target to form inorganic compound layer 11. Here as an example, a description is made as an example for a case where lithium tungstate ($Li_2WO_4$) is used.

Samples 1KA through 1KF were produced as shown in table 6. In producing these samples, each inorganic compound layer 11 was formed that was composed of a compound having the chemical composition expressed by $Li_xPW_yO_z$, with a different W/P, namely the mole fraction of W to P, with the power of sputtering rf being changed in the makeup of sample 1K. Value W/P corresponds to y in the composition formula. Other conditions were the same as in sample 1K. Each value W/P was 0.01, 0.1, 0.25, 0.33, 1.0, and 2.0, for samples 1KA through 1KF, respectively. Table 6 shows respective compositions of inorganic compound layers in samples 1KA through 1KF as well.

TABLE 6

| Sample | Composition of inorganic compound layer |
|---|---|
| 1KA | $Li_{3.02}PW_{0.01}O_{4.04}$ |
| 1KB | $Li_{3.2}PW_{0.1}O_{4.4}$ |
| 1KC | $Li_{3.5}PW_{0.25}O_{5.0}$ |
| 1KD | $Li_{3.66}PW_{0.33}O_{5.32}$ |
| 1KE | $Li_{5.0}PW_{1.00}O_{8.0}$ |
| 1KF | $Li_{7.0}PW_{2.00}O_{12.0}$ |

Active material layer: Si

Figure 4:
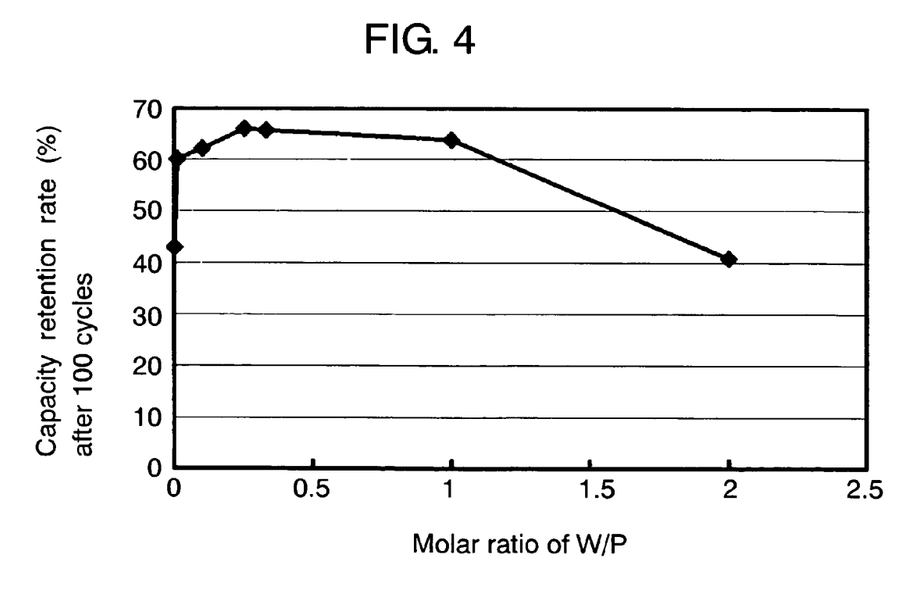
FIG. 4 illustrates another relationship between W/P and another capacity retention rate of another composition in an inorganic compound layer according to the first embodiment of the present invention.

Evaluation was performed for these samples produced in the same way as in sample 1K. FIG. 4 illustrates the relationship between the capacity retention rate and W/P after 100 cycles of charge/discharge performed for the each battery using negative electrode 1 with $Li_xPW_yO_z$ having a different W/P formed in inorganic compound layer 11. As evidenced by FIG. 4, the capacity retention rate is 60% or higher with a W/P between 0.1 and 1.0, indicating favorable characteristics.

Comparison of FIG. 3 with FIG. 4 proves that the capacity retention rate is lower when $Li_2WO_4$ is used instead of W as a target than when W is used, even for the same W/P (i.e. value y). However, the capacity retention rate is 60% or higher even for a W/P between 0.5 and 1.0.

Although this reason is unclear, another examination proves that the reactivity of inorganic compound layer 11 with metal lithium changes depending on W/P (value y). That is, $Li_xPW_yO_z$ is directly formed on the surface of metal lithium, and after it is left in a dry air with a dew-point temperature of −40° C. for two weeks, discoloration is observed on the surface of the metal lithium for a large W/P. If W is used as a target, discoloration is found for a W/P higher than 0.5; if $Li_2WO_4$ is used, higher than 1.0. In other words, the reactivity of inorganic compound layer 11 with metal lithium proves to be low even for a W/P higher than 0.5 and not higher than 1.0. Such a result is assumed from the similar reaction occurring because lithium ions are reduced on negative electrode 1 in discharging.

As mentioned above, value y, namely the mole fraction of component T to P, is preferably in an appropriate range. Depending on what type of target component T is obtained from, appropriate ranges of values x and z are automatically determined according to value y. This is because the valence numbers of respective atoms are fixed as aforementioned. That is, if the target is transition metal, x, y, and z satisfy $2.05 \leq x \leq 3.0$, $0.01 \leq y \leq 0.5$, and $3.5 \leq z \leq 4.0$, respectively. If the target is transition metal oxide, $2.0 \leq x \leq 3.0$, $0.01 \leq y \leq 1.0$, and $3.5 \leq z \leq 7.0$. If the target is lithium oxyacid salt, $2.0 < x < 7.0$, $0.01 \leq y \leq 1.0$, and $3.5 \leq z \leq 8.0$.

Second Exemplary Embodiment

A conceptual diagram illustrating the basic structure according to a second embodiment of the present invention is the same as FIG. 1. Inorganic compound layer 11 on negative electrode 1 according to this embodiment is composed of a compound having the chemical composition expressed by $Li_xMO_yN_z$. M is at least one kind of element selected from the element group of element symbols Si, B, Ge, Al, C, Ga, and S, and additionally x, y, and z satisfy $0.6 \leq x \leq 1.0$, $1.05 \leq y \leq 1.99$, and $0.01 \leq z \leq 0.5$, respectively; $1.6 \leq x \leq 2.0$, $2.05 \leq y \leq 2.99$, and $0.01 \leq z \leq 0.5$, respectively; $1.6 \leq x \leq 2.0$, $3.05 \leq y \leq 3.99$; $0.01 \leq z \leq 0.5$, respectively; or $4.6 \leq x \leq 5.0$, $3.05 \leq y \leq 3.99$, and $0.01 \leq z \leq 0.5$, respectively. Compound $Li_xMO_yN_z$ is also material superior in lithium ion conductivity and moisture resistance, and is discovered by the inventors of the present invention as disclosed in Japanese Patent Unexamined Publication No. 2005-38844.

Bonding between component element M and oxygen in $Li_xMO_yN_z$ is thermodynamically more stable than that between phosphorus and oxygen in lithium phosphorus oxynitride. Consequently, this composition keeps the structure of the solid electrolyte stably even if contacting water molecules, suppressing a decrease in ion conductivity in a humid environment. Further, stabilization of inorganic compound layer 11 allows achieving strong protection of active material layer 10 storing lithium ions.

Thus, compound $Li_xMO_yN_z$ allows bonding between component M and oxygen to be more stable than that between phosphorus and oxygen in lithium phosphorus oxynitride even in a humid environment. Meanwhile, $Li_xMO_yN_z$ is required to present preferable ion conductivity.

From such a viewpoint, if the lithium oxyacid salt as raw material is $LiBO_2$, $LiAlO_2$, or $LiGaO_2$, namely, component M is B, Al, or Ga, in the above-mentioned general formula, x, y, and z preferably satisfy $0.6 \leq x \leq 1.0$, $1.05 \leq y \leq 1.99$, and $0.01 \leq z \leq 0.5$, respectively. If the lithium oxyacid salt is $Li_2SiO_3$, $Li_2GeO_3$, or $Li_2CO_3$, namely if component M is Si, Ge, or C in the above-mentioned general formula, $1.6 \leq x \leq 2.0$, $2.05 \leq y \leq 2.99$, and $0.01 \leq z \leq 0.5$. If the lithium oxyacid salt is $Li_2SO_4$, namely if component M is S in the above-mentioned general formula, x, y, and z preferably satisfy $1.6 \leq x \leq 2.0$, $3.05 \leq y \leq 3.99$, and $0.01 \leq z \leq 0.5$. If the lithium oxyacid salt is L is $AlO_4$, namely if component M is Al in the above-mentioned general formula, x, y, and z preferably satisfy $4.6 \leq x \leq 5.0$, $3.05 \leq y \leq 3.99$, and $0.01 \leq z \leq 0.5$.

Values of x and y can be changed according to the amount and kind of lithium oxyacid salt to be used for raw material, and z can be changed according to the amount and pressure of nitrogen for forming inorganic compound layer 11. From the viewpoint of ion conductivity, the range of z is particularly important. Value z lower than 0.01 presents a problem with ion conductivity and value z higher than 0.5 causes the framework structure to be easily destroyed, disturbing ion conductivity in either case.

A method of forming inorganic compound layer 11 composed of a compound having the chemical composition expressed by $Li_xMO_yN_z$ is preferably the following. That is, a lithium-phosphate-base compound and lithium oxyacid salt including component elements of M group such as $Li_2SiO_3$, $LiBO_2$, $LiAlO_2$, $Li_5AlO_4$, $Li_2GeO_3$, $LiGaO_2$, $Li_2SO_4$, and $Li_2CO_3$ are preferably employed as a target. To introduce N, sputtering with nitrogen gas or deposition in a nitrogen atmosphere is preferably used to substitute nitrogen atoms for part of oxygen atoms. Instead of the above-mentioned lithium oxyacid salt, $Li_2O$ and an oxide of component element M such as $SiO_2$, $GeO_2$, $B_2O_3$, $Al_2O_3$, or $Ga_2O_3$ or a mixture thereof can be employed as the target. In such a kind of solid electrolyte, the valence numbers of the lithium atom and oxygen atom are positive univalent and negative divalent, respectively. The valence number of the nitrogen atom is negative trivalent. Element M has the same valence number as that of a compound used as the target.

A method for deriving x, y, and z in prepared $Li_xMO_yN_z$ is described hereinafter. That is, the ratio of element M is assumed to be 1 first. Next, the ratios of oxygen atoms and nitrogen atoms to element M are derived with nitrogen oxygen analysis (inert gas-impulse heating fusion method) or the like, to calculate y and z. Value x is calculated from the above-mentioned valence number assuming that the entire valence number is 0.

The other conditions such as the forming method of active material layer 10, the configuration of collector 9, the forming method, thickness and the like of inorganic compound layer 11, are the same as in the first exemplary embodiment. If active material layer 10 includes metal, the metal is preferably alloyed with at least a part of collector 9, which is the same as in the first exemplary embodiment.

Producing negative electrode 1 as above-mentioned increases resistibility of negative electrode 1 against moisture and suppresses deterioration of the cycling characteristics of a battery using negative electrode 1. Such negative electrode 1 is applicable to any lithium battery using a negative electrode storing/releasing lithium ions and including Si or Sn as an elementary substance, compound, or alloy, improving the storage stability and charge/discharge cycling characteristics.

When a battery is charged/discharged, negative electrode 1 functions as a negative electrode, only after lithium is stored in active material layer 10, which does not directly contact electrolyte 3, through inorganic compound layer 11. That is, inorganic compound layer 11, facing electrolyte 3, works as a moving path of lithium ions to active material layer 10 separated from electrolyte 3. With this makeup, even if electrolyte 3 includes moisture, inorganic compound layer 11 can continue working as a moving path of ions, without being influenced by moisture of electrolyte 3.

Hereinafter, a description is made for the features and advantages of the second exemplary embodiment according to the present invention with concrete practical examples. As an example, inorganic compound layer 11 was formed that was composed of a compound having the chemical composition expressed by $Li_xMO_yN_z$ on active material layer 10 formed on collector 9 made of Cu in the same way as in sample 1 in the first exemplary embodiment.

To form inorganic compound layer 11, lithium oxyacid salts shown in table 7 were used as a target, respectively, and sputtering was performed with rf magnetron sputtering using nitrogen gas. The conditions for sputtering were set as following: inner pressure of 2.7 Pa; gas flow rate of 10 sccm;

high-frequency radiation power of 200 W; and sputtering time of 20 minutes. The thickness of obtained inorganic compound layer 11 was approximately 0.15 μm. The compositions of inorganic compound layers 11 in respective samples were shown in table 7.

TABLE 7

| Sample | Lithium oxyacid salt | Composition of inorganic compound layer | Capacity retention rate (%) |
|---|---|---|---|
| 21 | $Li_2SiO_3$ | $Li_{1.8}SiO_{2.45}N_{0.3}$ | 69.5 |
| 22 | $LiBO_2$ | $Li_{0.8}BO_{1.45}N_{0.3}$ | 63.9 |
| 23 | $Li_2GeO_3$ | $Li_{1.8}GeO_{2.45}N_{0.3}$ | 60.6 |
| 24 | $LiAlO_2$ | $Li_{0.8}AlO_{1.45}N_{0.3}$ | 66.0 |
| 25 | $Li_5AlO_4$ | $Li_{4.8}AlO_{3.45}N_{0.3}$ | 69.8 |
| 26 | $Li_2CO_3$ | $Li_{1.8}CO_{2.45}N_{0.3}$ | 61.6 |
| 27 | $LiGaO_2$ | $Li_{0.8}GaO_{1.45}N_{0.3}$ | 65.8 |
| 28 | $Li_2SO_4$ | $Li_{1.8}SO_{3.45}N_{0.3}$ | 60.9 |
| Comparative sample 1 | — | $Li_{2.8}PO_{3.45}N_{0.3}$ | 43.4 |

Using obtained negative electrode 1 of samples 21 through 28, batteries were produced in the same way as in the first exemplary embodiment. For comparison, using comparative sample 1 in the first exemplary embodiment, a battery was produced in the same way. Evaluation was performed for these batteries on the same conditions as in the first exemplary embodiment. As the result, the capacity retention rates after 100 cycles of charge/discharge are shown in table 7.

As is clear from table 7, comparative sample 1 using an inorganic compound layer composed of LIPON had a capacity retention rate of 43.4%. Contrarily, samples 21 through 28, each forming inorganic compound layer 11 composed of a compound having the chemical composition expressed by $Li_xMO_yN_z$ retained a capacity retention rate of 60% or higher even after 100 cycles, presenting superior cycling characteristics.

Next, a description is made for an example where inorganic compound layer 11 was formed using a mixture of two different kinds of lithium oxyacid salts as a target for sputtering. On the same conditions as those in samples 21 through 28, except that a mixture of lithium oxyacid salts (molar ratio 1:1) shown in table 8 were used to form inorganic compound layer 11, negative electrodes 1 of samples 31 through 43 that were formed with inorganic compound layers 11 composed of nitride of lithium oxyacid salt respectively, were produced. Batteries were produced on the same conditions as in the first exemplary embodiment except for the method and composition for inorganic compound layer 11, to evaluate the cycling characteristics. The compositions of inorganic compound layers 11 and the capacity retention rates after 100 cycles of charge/discharge, namely the evaluation result, are shown in table 8.

TABLE 8

| Sample | Lithium oxyacid salt | Composition of inorganic compound layer | Capacity retention rate (%) |
|---|---|---|---|
| 31 | $Li_4SiO_4$, $LiBO_2$ | $Li_{2.3}Si_{0.5}B_{0.5}O_{2.45}N_{0.3}$ | 70.3 |
| 32 | $Li_4SiO_4$, $Li_4GeO_2$ | $Li_{3.8}Si_{0.5}Ge_{0.5}O_{3.45}N_{0.3}$ | 74.5 |
| 33 | $Li_4SiO_4$, $Li_2CO_3$ | $Li_{2.8}Si_{0.5}C_{0.5}O_{2.95}N_{0.3}$ | 69.2 |
| 34 | $Li_4SiO_4$, $Li_2SO_4$ | $Li_{2.8}Si_{0.5}S_{0.5}O_{3.45}N_{0.3}$ | 68.7 |
| 35 | $LiBO_2$, $Li_4GeO_2$ | $Li_{2.3}B_{0.5}Ge_{0.5}O_{2.45}N_{0.3}$ | 70.4 |
| 36 | $LiBO_2$, $Li_5AlO_4$ | $Li_{2.8}B_{0.5}Al_{0.5}O_{2.45}N_{0.3}$ | 69.3 |
| 37 | $LiBO_2$, $Li_2CO_3$ | $Li_{1.3}B_{0.5}C_{0.5}O_{1.95}N_{0.3}$ | 65.1 |
| 38 | $LiBO_2$, $LiGaO_2$ | $Li_{0.8}B_{0.5}Ga_{0.5}O_{1.45}N_{0.3}$ | 67.3 |
| 39 | $LiBO_2$, $Li_2SO_4$ | $Li_{1.3}B_{0.5}S_{0.5}O_{2.45}N_{0.3}$ | 64.7 |
| 40 | $Li_4GeO_4$, $Li_2CO_3$ | $Li_{2.8}Ge_{0.5}C_{0.5}O_{2.95}N_{0.3}$ | 69.2 |
| 41 | $Li_4GeO_4$, $Li_2SO_4$ | $Li_{2.8}Ge_{0.5}S_{0.5}O_{3.45}N_{0.3}$ | 68.8 |
| 42 | $LiGaO_2$, $Li_5AlO_4$ | $Li_{2.8}Ga_{0.5}Al_{0.5}O_{2.45}N_{0.3}$ | 70.3 |
| 43 | $Li_2SO_4$, $Li_2CO_3$ | $Li_{1.8}S_{0.5}C_{0.5}O_{2.95}N_{0.3}$ | 63.5 |

As evidenced by table 8, the batteries of samples 31 through 43 remained a capacity retention rate of 60% or higher even after 100 cycles, presenting superior cycling characteristics. Thus, in composed substance $Li_xMO_yN_z$ forming inorganic compound layer 11, component M may be composed of a plurality of elements. Here, although any data is not presented, component T in the first exemplary embodiment may be as well composed of a plurality of elements.

Next, the result of examining the range of value z in composition formula $Li_xMO_yN_z$ is described. Here the description is made as an example for a case where Si is used as component M. In producing samples 21A through 21H, each inorganic compound layer 11 was formed that was composed of $Li_xSiO_yN_z$ with a different N/Si, namely the mole fraction of N to Si, with the nitrogen pressure being changed in the makeup of sample 21. Value N/Si corresponds to value z in the composition formula. Other conditions were the same as in sample 21. Table 9 shows the compositions of inorganic compound layers 11. Each value N/Si is 0.005, 0.01, 0.1, 0.3, 0.5, 0.6, 0.8, and 1.0 for samples 21A through 21H.

TABLE 9

| Sample | Composition of inorganic compound layer |
|---|---|
| 21A | $Li_{1.8}SiO_{2.89}N_{0.005}$ |
| 21B | $Li_{1.8}SiO_{2.88}N_{0.01}$ |
| 21C | $Li_{1.8}SiO_{2.75}N_{0.1}$ |
| 21D | $Li_{1.8}SiO_{2.45}N_{0.3}$ |
| 21E | $Li_{1.8}SiO_{2.15}N_{0.5}$ |
| 21F | $Li_{1.8}SiO_{2.00}N_{0.6}$ |
| 21G | $Li_{1.8}SiO_{1.70}N_{0.8}$ |
| 21H | $Li_{1.8}SiO_{1.40}N_{1.0}$ |

Figure 5:
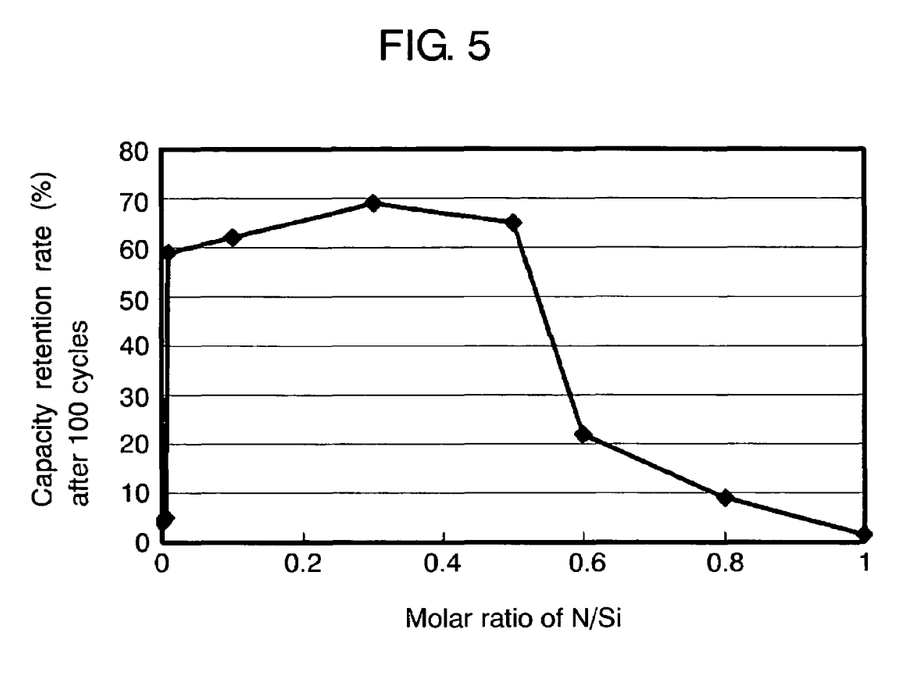
FIG. 5 illustrates a relationship between N/Si and a capacity retention rate of a composition in an inorganic compound layer according to the second embodiment of the present invention.

Evaluation was performed for batteries produced on the same conditions as in the first exemplary embodiment, using these samples. FIG. 5 illustrates the relationship between the capacity retention rate and N/Si after 100 cycles of charge/discharge performed for each battery using a negative electrode with $Li_xSiO_yN_z$ having a different N/Si formed in inorganic compound layer 11. As evidenced by FIG. 5, the capacity retention rate was largely dependent on N/Si, indicating an improvement effect with an N/Si of 0.01 or more. The capacity retention rate further increased as N/Si increased, stably indicating the highest value with an N/Si of 0.3 to 0.5. However, the capacity retention rate sharply decreased when N/Si exceeded 0.5, and the practicality was completely lost at 0.8. From these results, N/Si has the most preferably range between 0.3 and 0.5.

Although data is not presented, the following substance as component M of $Li_xMO_yN_z$ brings approximately the same result. That is, at least one kind of element selected from the element group of B, Ge, Al, C, Ga, and S, except for Si, and additionally x, y, and z satisfy $0.6 \leq x \leq 1.0$, $1.05 \leq y \leq 1.99$, and $0.01 \leq z \leq 0.5$, respectively; $1.6 \leq x \leq 2.0$, $2.05 \leq y \leq 2.99$, and $0.01 \leq z \leq 0.5$, respectively; $1.6 \leq x \leq 2.0$, $3.05 \leq y \leq 3.99$, and $0.01 \leq z \leq 0.5$, respectively; or $4.6 \leq x \leq 5.0$, $3.05 \leq y \leq 3.99$, and $0.01 \leq z \leq 0.5$, respectively. Further, the same result can be obtained when material other than Si is used for active material layer 10, although data is not presented.

In the above-mentioned first and second exemplary embodiments, the description is made for coin-type batteries as examples. The present invention, however, is not limited to such a battery shape.

INDUSTRIAL APPLICABILITY

A negative electrode for a battery according to the present invention has a negative electrode active material layer that reversibly stores/releases lithium and includes silicon (Si) or tin (Sn) as an elementary substance, compound, or alloy; and an inorganic compound layer that has lithium ion conductivity and is provided on the negative electrode active material layer. This negative electrode has improved stability of the above-mentioned negative electrode active material layer itself against moisture, thus significantly improving the cycling characteristics of a battery using electrolyte with possible risk of minute amounts of moisture being immixed.

The invention claimed is:

1. A negative electrode for a battery, the negative electrode comprising:

a collector;

an active material layer provided on the collector, the active material layer including at least one kind of matter in a group consisting of an elementary substance of tin, an elementary substance of silicon, an alloy including at least one of tin and silicon, and a compound including at least one of tin and silicon; and an inorganic compound layer provided on the active material layer, the inorganic compound layer having a chemical composition expressed by general formula (I) described below, and having lithium ion conductivity.

$$Li_xPT_yO_z \quad (1)$$

wherein component T is at least one kind of element selected from an element group consisting of element symbols Ti, Cu, Zr, Mo, Ta, and W, and additionally x, y, and z satisfy $2.0 \leq x \leq 7.0$, $0.01 \leq y \leq 1.0$, and $3.5 \leq z \leq 8.0$, respectively.

2. The negative electrode for a battery according to claim 1, wherein x, y, and z satisfy $2.0 \leq x \leq 3.0$, $0.01 \leq y \leq 0.50$, and $3.5 \leq z \leq 4.0$, respectively, in the general formula (I).

3. The negative electrode for a battery according to claim 1, wherein x, y, and z satisfy $2.0 \leq x \leq 3.0$, $0.01 \leq y \leq 1.0$, and $3.5 \leq z \leq 7.0$, respectively, in the general formula (1).

4. The negative electrode for a battery according to claim 1, wherein the active material layer includes lithium in a charged state.

5. The negative electrode for a battery according to claim 1, wherein the active material layer includes metal and the metal is alloyed with the collector at a part of an interface with the collector.

6. A battery comprising:

a negative electrode including:

a collector;

an active material layer provided on the collector, the active material layer including at least one kind of matter in a group consisting of an elementary substance of tin, an elementary substance of silicon, an alloy including at least one of tin and silicon, and a compound including at least one of tin and silicon;

an inorganic compound layer provided on the active material layer, the inorganic compound layer having a chemical composition expressed by general formula (1) described below, and having lithium ion conductivity;

electrolyte conducting lithium ions; and a positive electrode reversibly storing and releasing lithium ions.

$$Li_xPT_yO_z \quad (1)$$

wherein component T is at least one kind of element selected from an element group consisting of element symbols Ti, Cu, Zr, Mo, Ta, and W, and additionally x, y, and z satisfy $2.0 \leq x \leq 7.0$, $0.01 \leq y \leq 1.0$, and $3.5 \leq z \leq 8.0$, respectively.

* * * * *

UNITED STATES PATENT AND TRADEMARK OFFICE
CERTIFICATE OF CORRECTION

PATENT NO. : 7,632,607 B2  Page 1 of 1
APPLICATION NO. : 10/575889
DATED : December 15, 2009
INVENTOR(S) : Masaya Ugaji et al.

It is certified that error appears in the above-identified patent and that said Letters Patent is hereby corrected as shown below:

On the Title Page in Item "(56) References Cited", under "FOREIGN PATENT DOCUMENTS", the reference "JP  2004-171875  6/2004" appears in duplicate as "JP  2004171875 A *  6/2004". Please delete the second occurrence. Additionally, the same reference also appears under "OTHER PUBLICATIONS" as "JP 2004-171875 A, Jun. 2004, Kawase et al.*" Please also delete this occurrence.

In Column 17, Line 38 (Claim 1), "general formula (I)" should appear as --general formula (1)--; and
In Column 18, Line 6 (Claim 2), "general formula (I)." should appear as --general formula (1).--.

Signed and Sealed this

Fourth Day of May, 2010

David J. Kappos
*Director of the United States Patent and Trademark Office*